(12) United States Patent
D'Amelio et al.

(10) Patent No.: US 6,430,467 B1
(45) Date of Patent: Aug. 6, 2002

(54) PROCESSES FOR PACKAGING PERISHABLE AND OTHER PRODUCTS

(75) Inventors: Vince D'Amelio, Alpharetta; Marshall Martin Van Domelen, Conyers; John Kerry Hobbs, McDonough; Mike Tyberghein, Roswell, all of GA (US)

(73) Assignee: Rock-Tenn Company, Norcross, GA (US)

( * ) Notice: Subject to any disclaimer, the term of this patent is extended or adjusted under 35 U.S.C. 154(b) by 0 days.

(21) Appl. No.: 09/614,974

(22) Filed: Jul. 12, 2000

(51) Int. Cl.$^7$ ................................................. G06F 7/00
(52) U.S. Cl. ..................... 700/213; 53/467; 53/484; 53/473; 426/129; 426/396; 206/518; 206/519; 206/557
(58) Field of Search ................. 53/427, 467, 484, 53/441, 473; 426/129, 396; 206/503, 505, 506, 507, 509, 514, 515, 516, 519, 518, 557; 700/213

(56) References Cited

U.S. PATENT DOCUMENTS

| | | |
|---|---|---|
| 1,221,789 A | 4/1917 | Brown |
| 3,539,552 A * | 11/1970 | Mounts et al. ............... 220/97 |
| 3,563,445 A | 2/1971 | Clayton |
| 3,885,727 A | 5/1975 | Gilley |
| 3,885,729 A | 5/1975 | Rous et al. |
| 3,974,722 A | 8/1976 | Florian |
| 3,997,101 A | 12/1976 | Florian |
| D245,070 S | 7/1977 | Congleton |
| 4,054,207 A | 10/1977 | Lazure et al. |
| 4,057,651 A | 11/1977 | Floridan |
| 4,083,670 A | 4/1978 | Reifers et al. |
| 4,136,205 A | 1/1979 | Quattlebaum |
| 4,298,156 A | 11/1981 | Reifers et al. |
| D268,568 S | 4/1983 | Holden |
| 4,498,378 A | 2/1985 | Norrie et al. |

(List continued on next page.)

Primary Examiner—Chistopher P. Ellis
Assistant Examiner—Khoi H. Tran
(74) Attorney, Agent, or Firm—Kilpatrick Stockto LLP

(57) ABSTRACT

Packaging and processes for facilitating fast, efficient, and reliable production line packaging of products, and more particularly perishable products including meat products. Product trays according to the present invention are formed of non-foam plastic material with three dimensional structure and configuration that imparts an esthetically pleasing appearance and feel to the customer at the point of sale, as well as offering to the consumer a container that is microwavable, dishwasher safe and freezer safe in addition, if desired, to being recyclable. Such packaging and processes are particularly useful in newly emerging automated supply chains where inventory sales are tracked to support centralized processing of meat and other perishable products at centralized facilities for shipment to geographically distant points of sale. In these situations, the packaging must present the requisite esthetic, convenience and performance qualities to the customer at the point of sale even after having been loaded into a shipment container, transported often by truck over hundreds of miles, unpacked and placed in the product display case. Non-foam containers according to the present invention can accomplish these results by featuring separation structure to permit manufacture, storage, stacking, shipment, and dispensing on processing lines with minimum chance or potential of the sort of locking together which can otherwise occur with non-foam containers.

29 Claims, 15 Drawing Sheets

U.S. PATENT DOCUMENTS

| | | | |
|---|---|---|---|
| 4,498,585 A | | 2/1985 | Gordon et al. |
| 4,548,852 A | | 10/1985 | Mitchell |
| 4,660,734 A | * | 4/1987 | Heaney et al. ................ 220/74 |
| 4,672,793 A | | 6/1987 | Terlizzi, Jr. et al. |
| 4,685,274 A | * | 8/1987 | Garwood ..................... 53/433 |
| D292,881 S | | 11/1987 | Thompson |
| 4,714,164 A | | 12/1987 | Bachner |
| 4,761,156 A | | 8/1988 | Bachner et al. |
| 4,790,450 A | | 12/1988 | Archibald |
| 4,804,092 A | | 2/1989 | Jones |
| 4,840,270 A | | 6/1989 | Caputo et al. |
| 4,899,925 A | | 2/1990 | Bowden et al. |
| 4,957,271 A | | 9/1990 | Summers et al. |
| 5,018,623 A | | 5/1991 | Hrenyo |
| 5,050,791 A | | 9/1991 | Bowden et al. |
| 5,094,547 A | | 3/1992 | Graham |
| 5,226,531 A | | 7/1993 | Garwood |
| 5,329,748 A | * | 7/1994 | Belsito ....................... 53/447 |
| 5,334,405 A | | 8/1994 | Gorlich |
| 5,352,467 A | | 10/1994 | Mitchell et al. |
| 5,503,858 A | * | 4/1996 | Reskow ..................... 426/119 |
| 5,533,623 A | | 7/1996 | Fischer |
| 5,597,599 A | | 1/1997 | Smith et al. |
| 5,667,827 A | * | 9/1997 | Breen et al. ................ 426/119 |
| 5,673,783 A | | 10/1997 | Radant et al. |
| 5,705,213 A | | 1/1998 | Guillin |
| 5,711,978 A | | 1/1998 | Breen et al. |
| B15,018,623 A | | 5/1998 | Hrenyo |
| 5,816,488 A | | 10/1998 | Moeder |
| 5,820,955 A | | 10/1998 | Brander |
| 5,827,068 A | | 10/1998 | Sims |
| 5,876,180 A | | 3/1999 | Sims |
| 5,943,844 A | | 8/1999 | Wilhelm et al. |
| 6,047,819 A | | 4/2000 | Borst et al. |
| RE36,867 E | * | 9/2000 | Rozano ..................... 426/87 |
| 6,213,301 B1 | | 4/2001 | Landis et al. |

OTHER PUBLICATIONS

Photograph of REXAM Product.
Photograph of ANCHOR product.
Photograph of MAPfresh product.

* cited by examiner

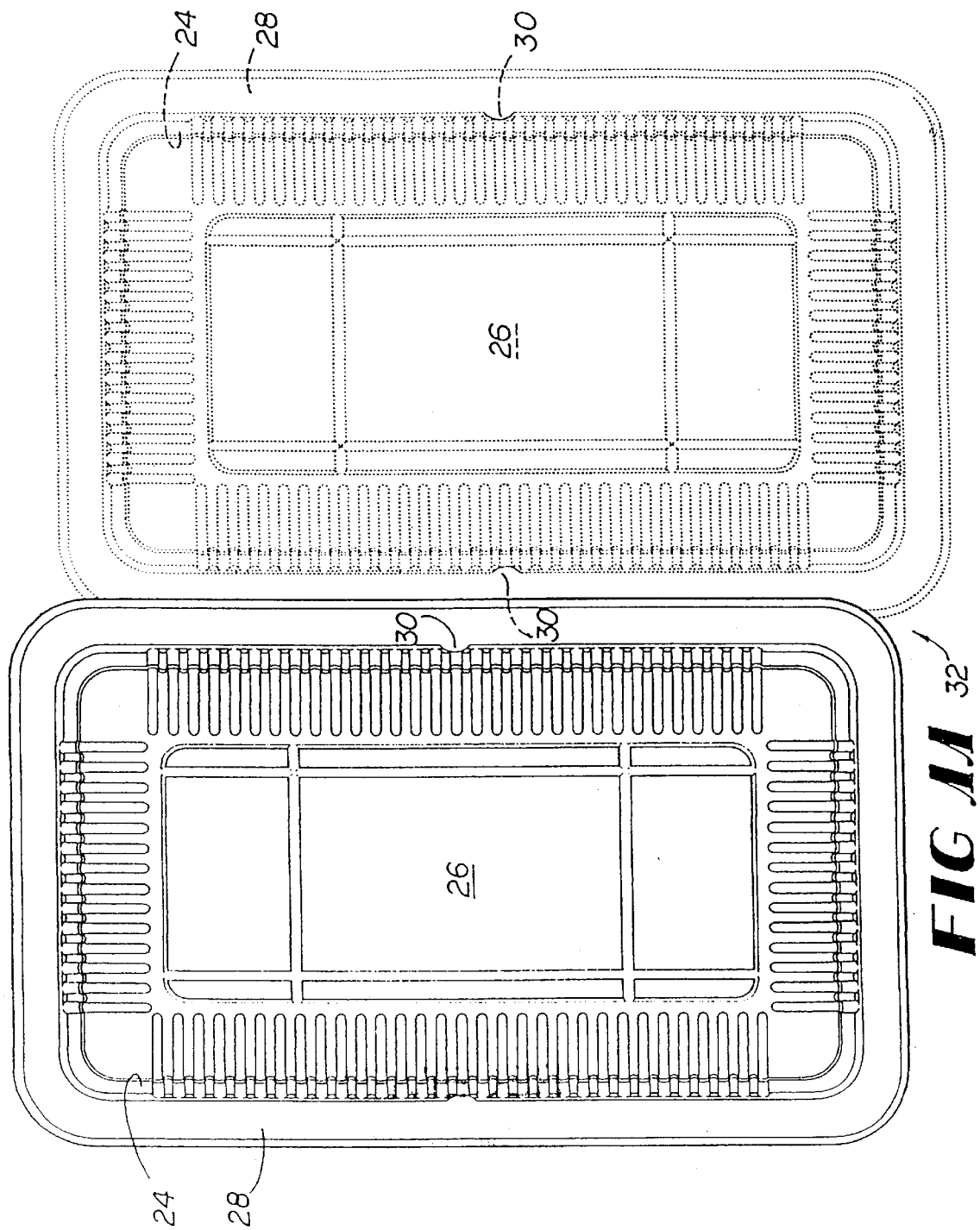

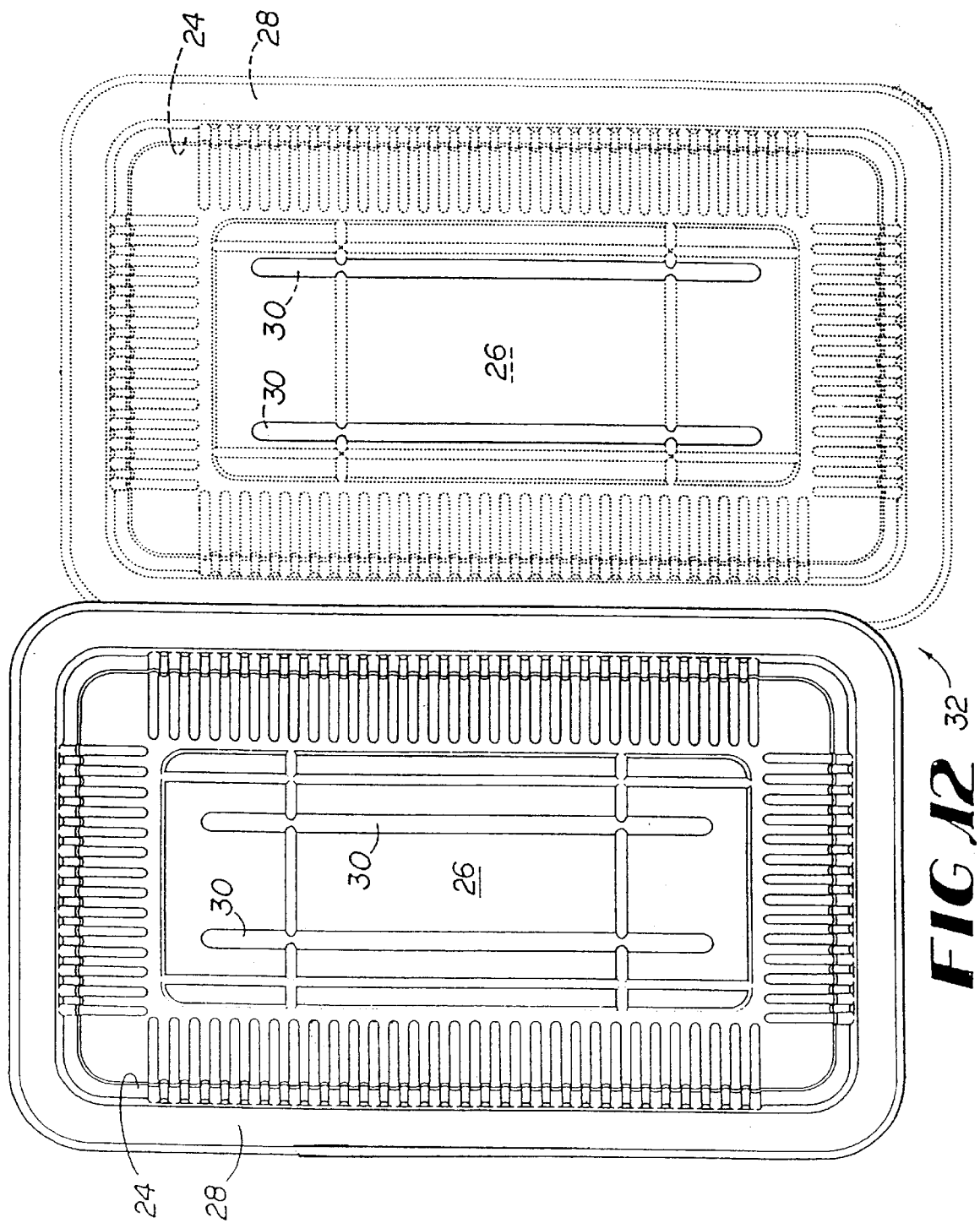

PROCESSES FOR PACKAGING PERISHABLE AND OTHER PRODUCTS

Conventional supply chains for meat products involve shipment of beef sides, pork sides, and other large cuts of meat to points of sale such as grocery retailers and, more recently, integrated grocery retailers and general goods suppliers such as large chain or "big box" stores. This supply chain reflects legacy processes which rely on localized butchering expertise from the days when meat products were grown and slaughtered more locally. The local grocery butcher remains hard at work even if processing facilities which ship sides of meat are more centralized currently than they have been.

These current processes reflect manual and to some extent more conventional supply chain management. However, recent automation of retail logistics, manufacturing and distribution supply chains gives rise to considerable efficiencies which drive the new large chain retail operations. Automated devices at each point of sale such as at cash registers can capture bar code and other information. They report that information in real time to centralized information technology facilities which can then automatically schedule purchase and shipment of replacement inventory and make other inventory control decisions based on consumer preferences and other factors. As a consequence, these chain operations move inventory more efficiently for an ultimately lower price to the customer with higher profit margin, even if they require closer support of points of sale via regional inventory centers coupled with sophisticated transportation and shipment techniques and management.

These automated techniques for retail operations have proved successful for clothing, dry goods, and other manufactured products which have relatively long shelf-life. Only recently have information processing power, cost and data network communications converged to provide, according to Moore's Law, automated solutions that are sufficiently sophisticated and powerful to manage and control packaging and distribution of perishable inventory with very short shelf life. Such systems are emerging which can, for instance, know when a retail operation has sold a particular unit such as a pound of ground beef, inform a regional processing center that such retail operation needs to replenish that unit of inventory, arrange for regional butchering, packaging and loading of that unit onto a truck or other transportation unit to the point of sale, and inform the point of sale that the shipment is on the way. Only recently has it become commercially viable to package meat products regionally into point of sale units such as a pound of ground beef in packaging that is customer ready for display at point of sale, then ship that product to the point of sale, which may be hundreds of miles distant, and do so based on automated processes which maximize the potential that there is a need for that unit at that point of sale and that it will be sold before the shelf life expires.

At the same time these automated supply chain logistics tracking and management systems are emerging, labor costs are increasing. Retail operations are particularly sensitive to labor costs because so much of their business is labor intensive. Stocking of shelves with SKU's of product, for example, is a manual operation, as are other activities aimed at offering to the customer a pleasing array of various products at a reasonable price. This problem is exacerbated by additional competitive pressure driven by the low margins and competitive nature of the grocery industry generally.

Recently, automation has had its own effect on this industry in another way by giving rise to Internet grocery suppliers such as WebVan. WebVan allows users to select perishable and non-perishable grocery products using their browsers, which the WebVan organization receives in hypertext markup language or other automated scripts or forms, and then fulfills from a central distribution facility via delivery trucks to customer's houses. Although WebVan is required to absorb the labor intensive activity of picking and packing products for delivery to particular customers, which the customers themselves ordinarily do in a grocery store, that additional cost is more than compensated for by the fact that WebVan does not have to own or pay rent for prime retail space at prime commercial locations. This form of automated grocery logistics will only increase the pressure on the grocery business as conducted at retail points of sale. In the Webvan or internet grocery supplier paradigm, which is a prime candidate to make use of packaging and processes according to the present invention, the point of sale may be the warehouse which serves a city or part of a city, or other facility from which delivery trucks transport products to customers' homes.

All of these factors create a climate which increases the premium on doing business more efficiently and effectively to provide grocery consumers a wide and pleasing array of product at a reasonable price with a pleasant buying experience. Perishable products such as meat, vegetables, fruit are key to success in this connection, given that a major factor in consumers' decisions about where to buy groceries hinges on high quality produce and meat products, as well as other perishable products.

Meat products in particular are a major focus of consumer attention in the grocery purchasing experience. Meat which is too blue, gray, or otherwise of the wrong color, or which is otherwise unattractively packaged, for instance, can literally send a customer to another grocery store. This loss not only deprives the point of sale from selling that meat product unit, but also sometimes carries through to the rest of the contents of the customer's shopping cart. Accordingly, it is of paramount importance to grocery retailers that meat products are packaged in a literally mouthwatering fashion with attractive color and appearance, convenient and attractive presentation, and accurate and informative labeling. But not only must the meat product unit be attractive and appealing visually; it must also have the right feel. Customers often pick over meat products in the meat display looking for the right cut or size or product. Packaging which is insufficiently robust or sturdy can be damaged, which can detract from visual appearance and can cause leakage and spoilage. Accordingly, it is a prerequisite that packaging not only have the right look and feel, but that it must sustain normal wear and tear at the point of sale before the sale occurs. This robustness issue is perhaps less significant where meat is cut and packaged at the point of sale by the butcher. Where the packaging is performed at a distant location, however, and the unit is then shipped to the point of sale, packaging robustness becomes a far greater issue.

Consumers also prefer convenience, in addition to aesthetically pleasing packaging. Retailers can offer a distinct advantage to the customer if they can present meat products in containers that are microwavable, dishwasher safe and thus reusable, and freezer safe. In addition, it is or may be preferable to offer perishable foods packaging that is recyclable, such as suitable for curbside pickup and recycliIng.

In sum, in the current economy, where automation and more efficient business practices generally are driving competition in the grocery industry, grocers must explore every avenue to become more efficient and customer oriented. In this climate, any labor intensive tasks which can be reduced need to be evaluated, including whether it continues to make economic sense to distribute meat products based on localized butchering at the point of sale. These new automation and business techniques, combined with labor expense in the current climate gives rise for the first time to the possibility of more centralized butchering combined with automated, sophisticated supply chain support of the meat case at the local retail grocery operation. This new climate, however, requires new and innovative packaging for perishable products, such as meat products. Not only must the packaging be at least as visually and tactilely pleasing to the customer as conventional meat product packaging. It must also be sufficiently sturdy and robust to survive not only normal wear and tear at the point of sale, but also packing at a centralized facility, transportation in a truck or other transportation unit sometimes for hundreds of miles, unpacking onto the loading dock, and placement in the meat display. It would be even more preferable to form the packaging of material that is microwavable, dishwasher safe and freezer safe, and even more preferably recyclable.

SUMMARY OF THE INVENTION

The present invention provides new forms of packaging and processes for manufacturing and using such packages. The packaging features requisite visual, tactile, esthetic and performance (microwavability, dishwasher safety, freezer safety, and if desired, recyclability) qualities to please the customer as well as requisite increased robustness and sturdiness required to survive distribution in more centralized meat processing supply chains according to evolving inventory control, manufacturing and distribution automation systems and processes and logistic processes. Such packaging and processes reflect and accommodate, more generally, an increased drive for efficiency and customer satisfaction in the continually evolving grocery industry.

As one example of packaging according to the present invention, meat trays can be manufactured of non-foam, thin polyethylene, polystyrene, polypropylene, PET, crystalline PET or other plastic material for increased robustness and to avoid the susceptibility of foam trays to damage during shipping. These trays may feature conventional laminates to serve as oxygen and/or moisture barriers as well as to provide a surface pleasing in appearance and feel to the customer and that receives plastic wrap or finishing or closure material acceptably. The thinner nature of the tray can combine with ribs, a flange and other reinforcement structures as desired to impart acceptable structural rigidity to withstand, for instance, a customer lifting a product unit by a corner and thus cantilevering potentially pounds of meat from that corner. These trays may feature requisite depth to protect the meat product, as, for instance, when necessary for stacking meat products in a shipping container for shipment via truck from a centralized processing and packaging facility to a retail point of sale. The depth can have a beneficial structural effect by imparting additional three dimensional stability and rigidity in a box-truss-like fashion. The depth of such non-foam containers can actually be less than the depth of a foam container with equivalent face size, since they may be formed with a smaller draft angle (more vertical sides) to contain the same amount of meat and gas for proper shelf life.

Non-foam plastic trays may be thermoformed or otherwise formed with a smaller draft angle, unlike foam trays where such angles cause splitting, cracking or other failures or degradation in the foam structure. Since packaging meat products requires a certain volume of gas (such as a conventional mixture of oxygen and carbon dioxide) to retain shelf life, containers with a smaller draft angle (steeper sides) present a distinct advantage: For a given face area (which corresponds to a top plan view of the container), a non foam container can hold more gas than a foam container. One advantage is, for instance, that more non-foam containers may be stacked in a given depth of display case.

Of significant importance is the requirement that meat trays in centralized packaging facilities must feed in a virtually fail safe manner onto the processing line, with no or virtually no hang-ups, feeder jams, or double drops. In a centralized processing facility, it will generally be the case that a horizontal production line conveys the meat through multiple stations to form a product unit. For instance, to form a product unit of a pound of ground beef, an automated feeder can drop or otherwise dispense a tray from the bottom of a stack of trays onto a moving conveyor. The tray may be dropped by gravity or it may be pulled in conventional fashion onto the conveyor using a vacuum pickup. The tray is then indexed by the conveyor to a meat insertion station, which may be manual or automatic. For instance, an operator may place an approximate pound to five pounds of meat into the tray. Then, the filled tray may be indexed to another station for application of sealed lid stock or otherwise finishing with appropriate container closure such as, for example, film. This step may happen manually at the feeding station or at another station, or it may be automated. The meat may then be indexed to a weighing and labeling station, which can occur automatically, manually, or with a combination of the two. The finished unit may then be loaded into a shipping container or as otherwise desired, together with other product units of other cuts and sizes of beef, pork, chicken, and if desired fish, destined for a particular point of sale on a transportation unit.

Given the speed at which the processing occurs and the tight integration of the line process, a failure at the tray dispensing station is a material issue. For instance, if a tray fails to drop, meat can be dispensed onto the conveyor multiple times until the line is stopped. Double dropping can cause problems at the sealing station. Accordingly, it is of considerable importance to ensure that the non-foam trays dispense or denest reliably from the dispenser.

Because a limited number of processing lines must service a fleet of transportation units in real time that continually replenishes numerous points of sale in numerous geographic locations, the product unit preparation process cannot afford unwarranted interruption. Every operation on the production line must be as fail safe as possible. Because the tray is a central component in this operation, it must be engineered to feature structure and qualities that facilitate this fast and continuous production line and yet feature structure and qualities which achieve the required visual, tactile, and structural integrity qualities necessary to please the customer. Furthermore, the structure and qualities of the tray must achieve these objectives not only at the end of the production line, but also after packing, shipment often over long distances, unpacking, and being picked over by customers in the meat case.

Although non-foam trays present a number of distinct advantages, they do present special packaging issues when compared to foam trays. Non-foam trays typically tend to be more flexible than foam trays. Furthermore, many non-foam trays, because of the material of which they are made (olefins) tend to be more "slippery;" their comparatively waxy surface causes them to slide relative to each other more easily than foam trays. Consequently, non-foam trays can lock together during manufacture, during shipping and in the dispenser. For example, when the trays are stacked in a corrugated shipping container and that container is dropped on one of its corners or edges, the pressure can cause corners of certain trays to telescope or lock into each other. This locking, if not detected and corrected before the point at which the trays are denested onto the processing line, can jam the dispenser, or it can cause multiple trays to drop together onto the line. Either condition will require the processing line to be stopped and the condition resolved.

The present invention overcomes these issues with new structures and processes which impart specially shaped or positioned separation structures on the trays to create separation between the trays. The structures cause the trays to be separated by a predetermined layer of air, when they are stacked and ready for being dispensed onto the production line.

According to a first category of the invention, trays according to the present invention may be manufactured in two or more versions. For instance, version A of a tray features one or more separation structures such as a lug or lugs located at a first position or set of positions on the tray and version B features separation structures, which may be of the same shape or different shapes, located at a different position or set of positions. When the trays are stacked, version A trays are interleaved with version B trays so that the separation structures preclude the trays from telescoping into each other or otherwise locking together. The stack of trays when placed in the feeder allows individual trays, because of their distance from each other (which can be adjusted by dimensioning the separation structures as desired), more easily to be sensed and handled by the electromechanical sensors and handling components of the feeder. The distance also allows successive trays to be dropped without the locking which could otherwise cause hang-ups, jams, double drops and/or inaccurate feeds.

According to another category of the present invention, two versions of a tray may be manufactured for interleaved stacking as in the first embodiment, but featuring separation structures in the same locations on version A trays and version B trays. Here, the separation structures are shaped differently in a manner that precludes version A trays from nesting beyond the desired separation distance to version B trays and vice versa.

According to a third category of the present invention, which uses only one version of tray, separation structures feature three dimensionality such as solidity to prevent undue nesting and to maintain separation. (Such three dimensionality may require a molding process other than thermoforming.) Here, additional molding complications and plastic requirements may be more than met by additional attractiveness of product and avoiding complications associated with manufacturing and stacking multiple versions of trays in a fail safe way.

In any of these categories, the draft angle of the separation structures, if located on the corners or sidewalls of the containers (in addition to, if desired, dimension and number of structures) may be varied to adjust the locking preclusive effect. For example, a lug in the corner of a tray with an undercut draft may present a larger surface area and/or more efficient load bearing structure) to the tray immediately above, and thereby increase resistance to locking so that more trays may be stacked for shipping.

It is accordingly an object of the present invention to provide plastic packaging for products, preferably perishable products, more preferably meat products, which offers acceptable point of sale appearance and feel, requisite convenience and performance for the consumer, adequate robustness to maintain such appearance and feel even after centralized packaging, shipment, and point of sale wear and tear and yet facilitate and not interrupt the fast and continuous packaging process lines necessary to support centralized processing and packaging, and distribution supply chains.

It is an additional object of the present invention to provide trays which feature structural, convenience, performance and esthetic qualities for optimizing packaging of perishable food products such as meat products, which products must be stacked and transported over long distances before reaching the point of sale.

It is an additional object of the present invention to provide perishable food packaging processes which facilitate centralized and automated perishable product packaging and distribution in an automated supply chain and yet yield a product which equals or exceeds the esthetic, convenience and performance and other functional requirements of conventional locally butchered and packaged meat products.

It is an additional object of the present invention to provide perishable food packaging which features structure, esthetic qualities, rigidity, and durability to facilitate automated inventory tracking and control techniques such as reliable labeling with bar coding, sensing by electromechanical or optical sensors, and other qualities which facilitate automated sensing, product control, and product handling required in automated supply chain systems.

It is an additional object of the present invention to provide new forms of perishable product packaging which saves on material cost and manufacturing costs by using nonfoam structures combined with three dimensionality such as ribs and flanges to provide a cost efficient solution for an automated supply chain environment where pleasing the customer remains paramount.

Other objects, features, and advantages of the present invention will become apparent with respect to the remainder of this document.

BRIEF DESCRIPTION OF DRAWINGS

FIG. 11 is a schematic top plan view of a tray according to a tenth embodiment of the present invention.

FIG. 12 is a schematic top plan view of a tray according to a eleventh embodiment of the present invention.

DETAILED DESCRIPTION OF THE DRAWINGS

Figure 1:
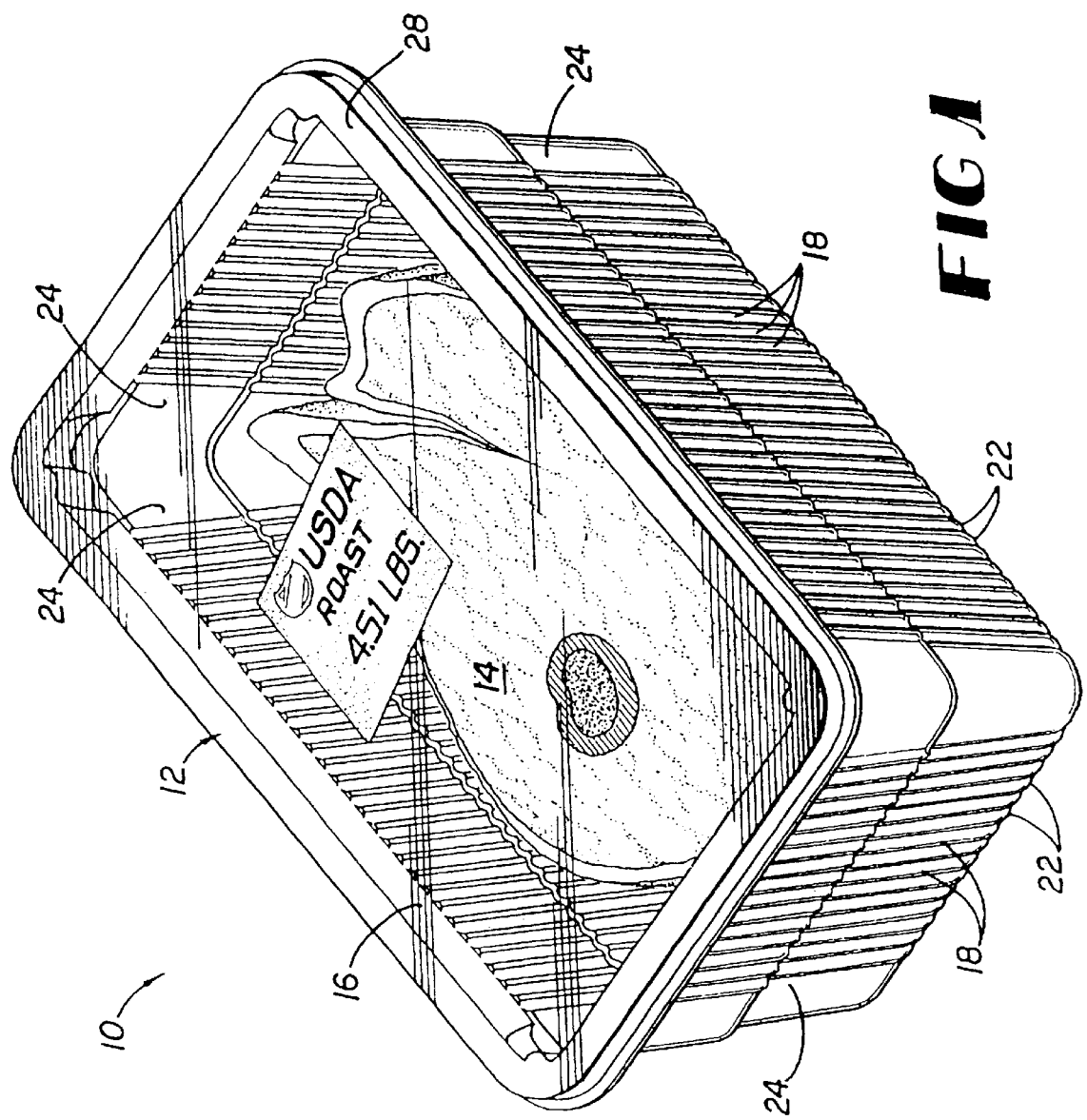
FIG. 1 is a perspective view of a perishable product packaged unit according to the present invention.

FIG. 1 shows a preferred embodiment of a perishable product packaging unit according to the present invention. The perishable product may be meat, vegetable product, or any other product subject to limited shelf life. In a preferred embodiment, the package unit 10 includes tray 12 which contains product 14 and is covered by with a wrap or other closure 16. The closure 16 may be thin film conventional wrap of any desired composition, or a more rigid plastic structure which may be bonded to tray 12 via adhesive, heat bonding, or it may be of any other desired material and connected to tray 12 in any way desired. Typically, the closure 16 is transparent or nearly so in order to allow the customer visual inspection of the product in an esthetically pleasing way, both visually and tactilely.

Tray 12 according to a preferred embodiment of the invention as shown in FIG. 1 is formed of a non-foam plastic material which is preferably polypropylene, polystyrene or polyethylene. Other suitable compositions include amorphous PET and crystalline PET. The tray 12 may be formed of the plastic material as by injection molding, thermoforming or any other desired process.

Product unit 10 generally and tray 12 more particularly are preferably engineered for a centralized and automated perishable product packaging and distribution supply chain. Here, unit 10 and all components including tray 12 must not only present product 14 in an aesthetically pleasing way to the customer at the retail point of sale with attractive performance and convenience features such as mircrowavability, diswasher safety and freezer safety (in addition to, if desired recyclability), but they must also continue to support a pleasing appearance and feel to the customer at the point of sale even after they have been packaged in a distant location, packed in a shipping container and thus subjected to potential significant deformation by pounds of other product stacked on top, shipped over potentially long distances, deposited on the loading dock at the point of sale and unpacked and loaded into the display case. In any event, non-foam containers which accomplish results such as these must be constructed to dispense onto a production line with minimal potential to lock together, in order to prevent jamming the dispenser, dropping of multiple containers, and other sources of interruption of the production line.

One feature of trays 12 according to a preferred embodiment of the invention as shown in FIG. 1, for instance, is a set of three dimensional structural enhancements such as vertical ribs 18, horizontal ribs 20, and joint structural enhancements 22 such as curved ribs around joints such as between side wall 24 and bottom 26. In addition, a flange 28 may extend around the upper extremities of side walls 24 and be U-shaped in cross-section, if desired, to impart additional deflection-strength and rigidity to the upper portions of tray 12. A U-shaped cross-section version of flange 28 which surrounds the upper periphery of tray 12, for instance, can provide requisite three dimensionality and stiffness to reduce the potential of the upper portions of side walls 24 of tray 12 to be deformed into a dog-boned shape from a rectangular shape when unit 10, loaded with a pound of meat, is lifted by a consumer or shipper by the corner. For instance, the flange 28 may feature a downturn component of approximately 3/16 inch, as opposed to 1/8 inch or none on conventional packaging. Horizontal ribs 20 may extend in one or more directions on bottom 26 of tray 12 as desired. Some or all may merge with vertical ribs 18 via joint enhancements 22 as desired for additional structural rigidity. These ribs can be formed in any manner desired, if they are indeed desirable in the tray 12, to lend requisite rigidity, durability and resistance to deformation by tray 12 without any or without significant additional plastic material being required. Vertical ribs 18 combined with joint enhancement 22 and other structure, if desired, can lend strength in the vertical direction to tray 12 in order to allow stacking of product during transportation without deformation or undue deformation of tray 12.

Figure 2:
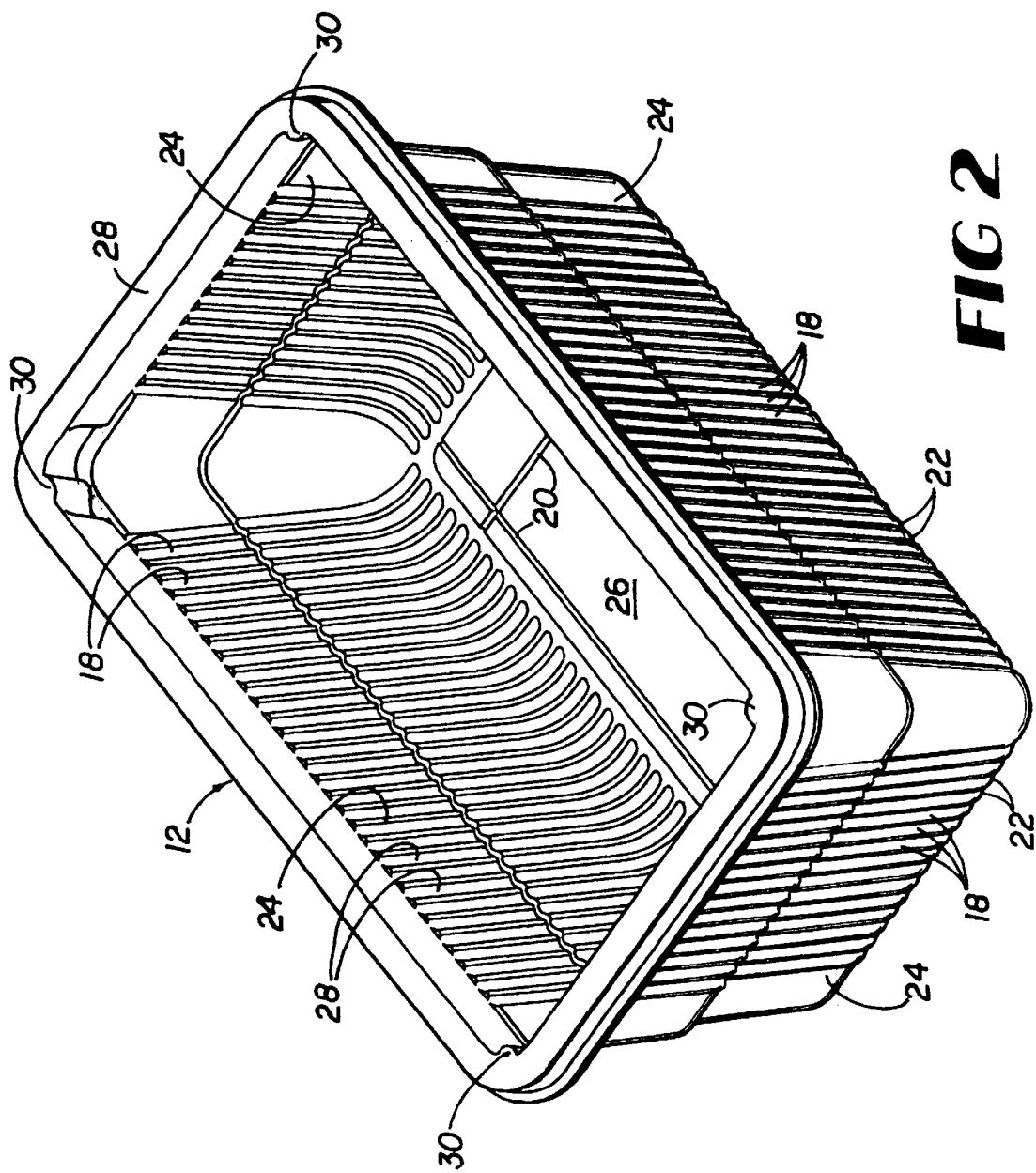
FIG. 2 is a perspective view of an empty tray of the unit of FIG. 1.
Figure 2A:
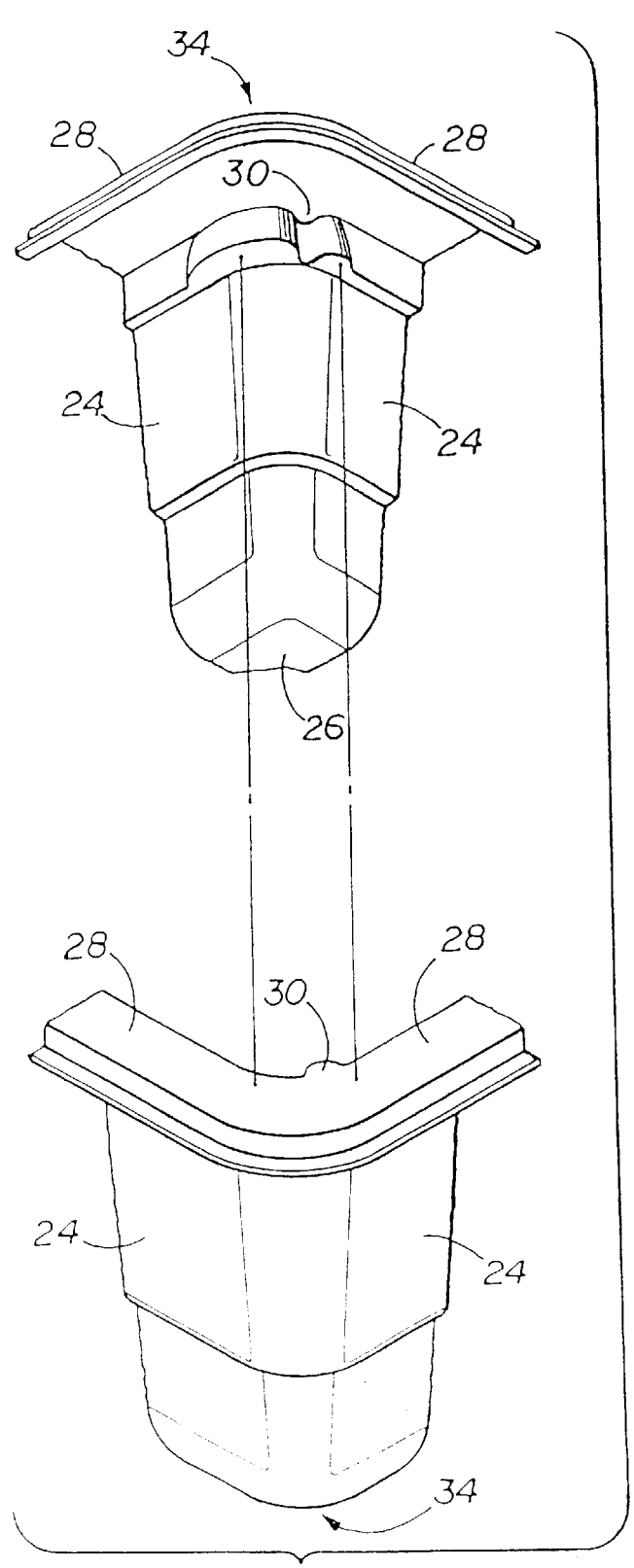
FIG. 2A is a perspective more detailed view of a corner of the tray of FIG. 1.
Figure 2B:
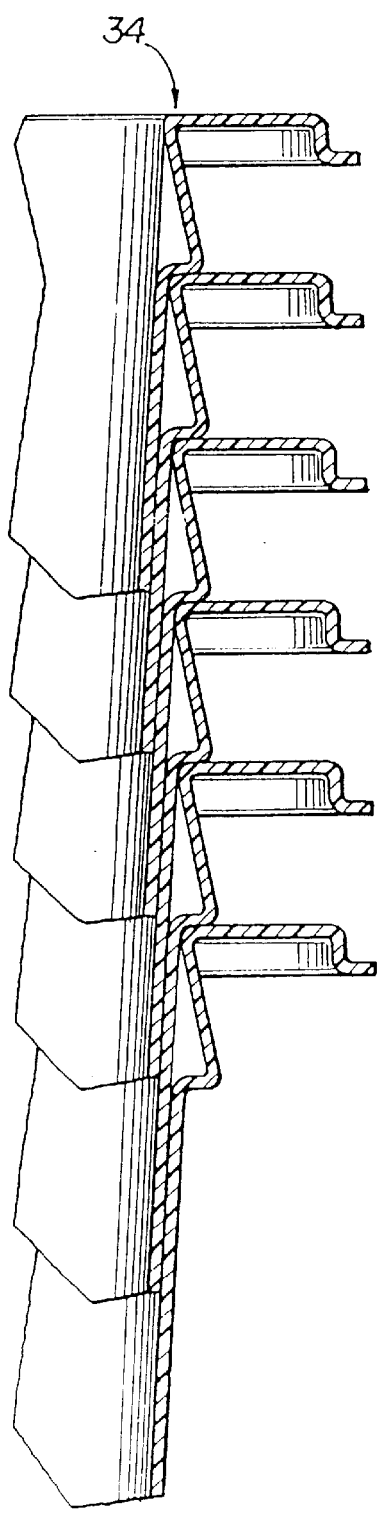
FIG. 2B is a schematic cross sectional view of a portion of a stack of trays according to FIG. 1, showing separation of trays as created by separation structures according to the present invention.

FIG. 2 shows the tray 12 of the package unit 10 of FIG. 1. FIG. 2 focuses on the separation structure 30 according to one particular embodiment of the present invention. Separation structure 30, which is shown more closely in FIG. 2A as discussed more generally above, functions to separate trays 12 in a stack 32 of trays (shown in FIG. 2B), so that trays 12 may feed or deploy onto a product packaging line reliably and in a manner that facilitates speed and efficiency, and avoids trays 12 locking together or other compromises of speed or reliability in being deployed onto a product packaging line. Separation structures 30 may be implemented at least according to any of the three broad categories or ways of the invention discussed in the "Summary of the Invention" section above to carry out this function and achieve these results.

Figure 3:
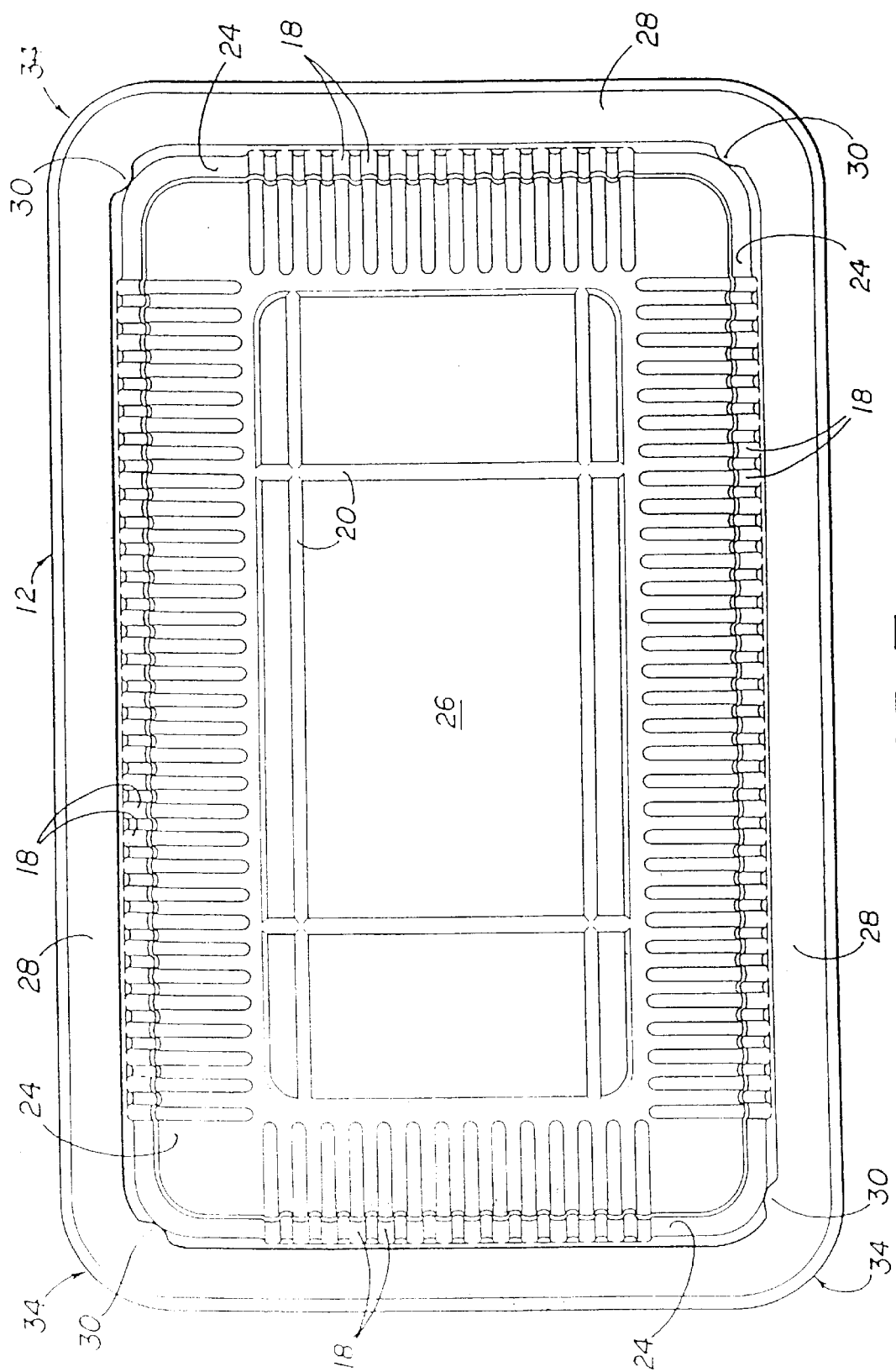
FIG. 3 is a schematic top plan view of a tray according to a second embodiment of the present invention.

FIG. 3 shows an embodiment of the present invention featuring two versions of tray 12. More versions may be used if desired in this embodiment or in any other embodiment of the invention where two versions of tray are discussed. (If three versions are used, the separation structures 30 preferably create predetermined separation between a version of the tray and the other two versions. If four versions are used, then it may be sufficient for separation structures 30 to maintain separation between that version and two other versions, but not that version and a fourth if it never encounters a fourth in the stack, and so on.) According to the embodiment shown in FIG. 3, separation structures 30 are located in the vicinity of corners 34 of version A of trays 12. Identically shaped, similarly shaped, or differently shaped separation structures 30 are located at different locations in the vicinity of corners 34 of tray 12 version B (they may just as easily be located anywhere else as desired on version B). When version A trays are interleaved or stacked adjacent to version B trays, the separation structures 30 maintain predetermined desired physical separation between trays 12 and preclude locking.

Figure 4:
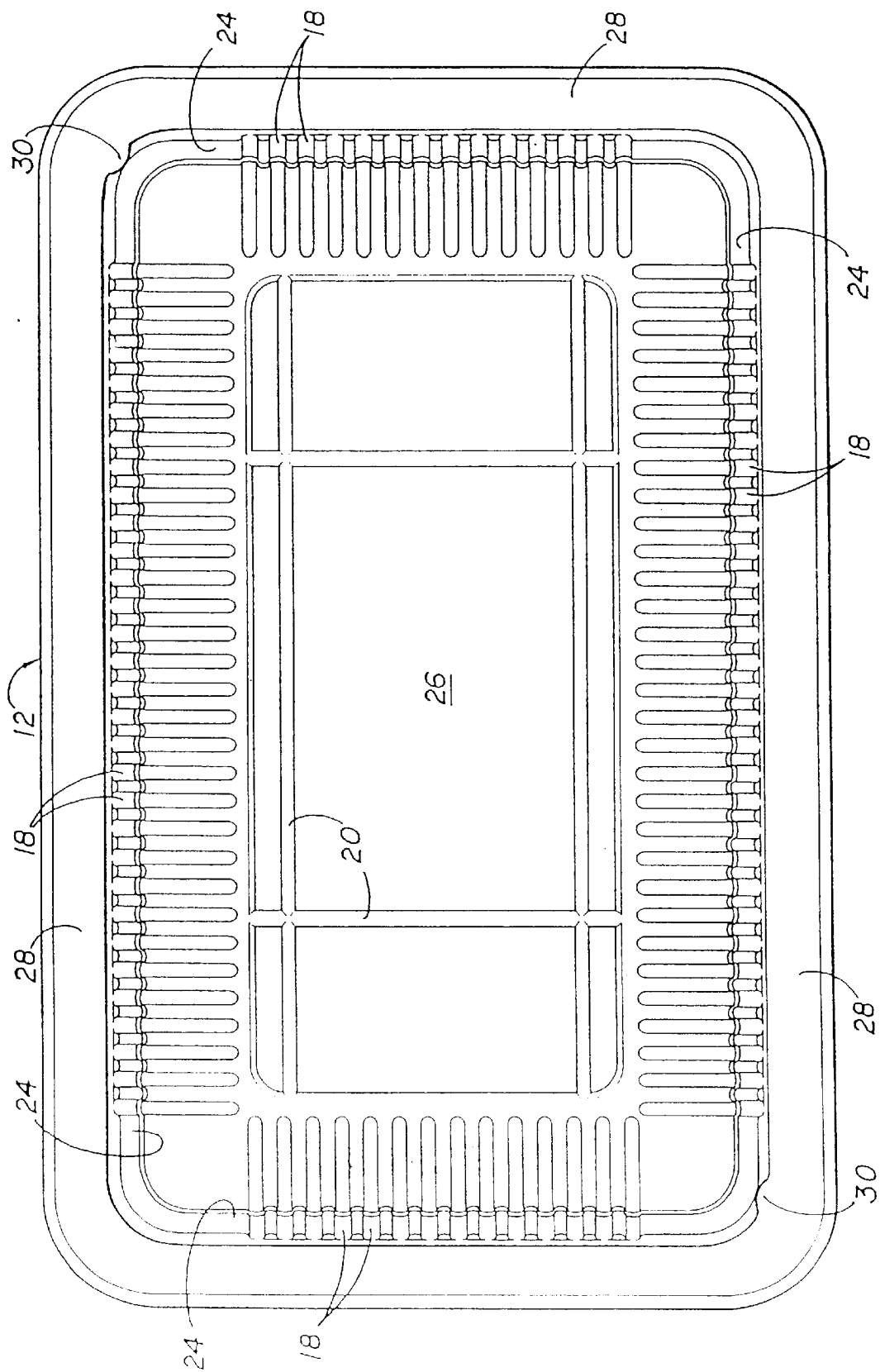
FIG. 4 is a schematic top plan view of a tray according to a third embodiment of the present invention.

FIG. 4 shows a tray 12 according to an embodiment of the present invention in which two versions of tray feature separation structures 30 in the vicinity of corners 34, but only at two corners instead of four as in FIG. 3. Structures 30 as shown in FIG. 4 may be shaped and positioned in the same or similar manner as separation structures 30 in FIG. 3. Any number of separation structures 30 may be positioned at any location or locations on version B to achieve structurally a predetermined physical separation of trays 12 and preclusion or reduction of trays locking together or telescoping into each other.

Figure 5:
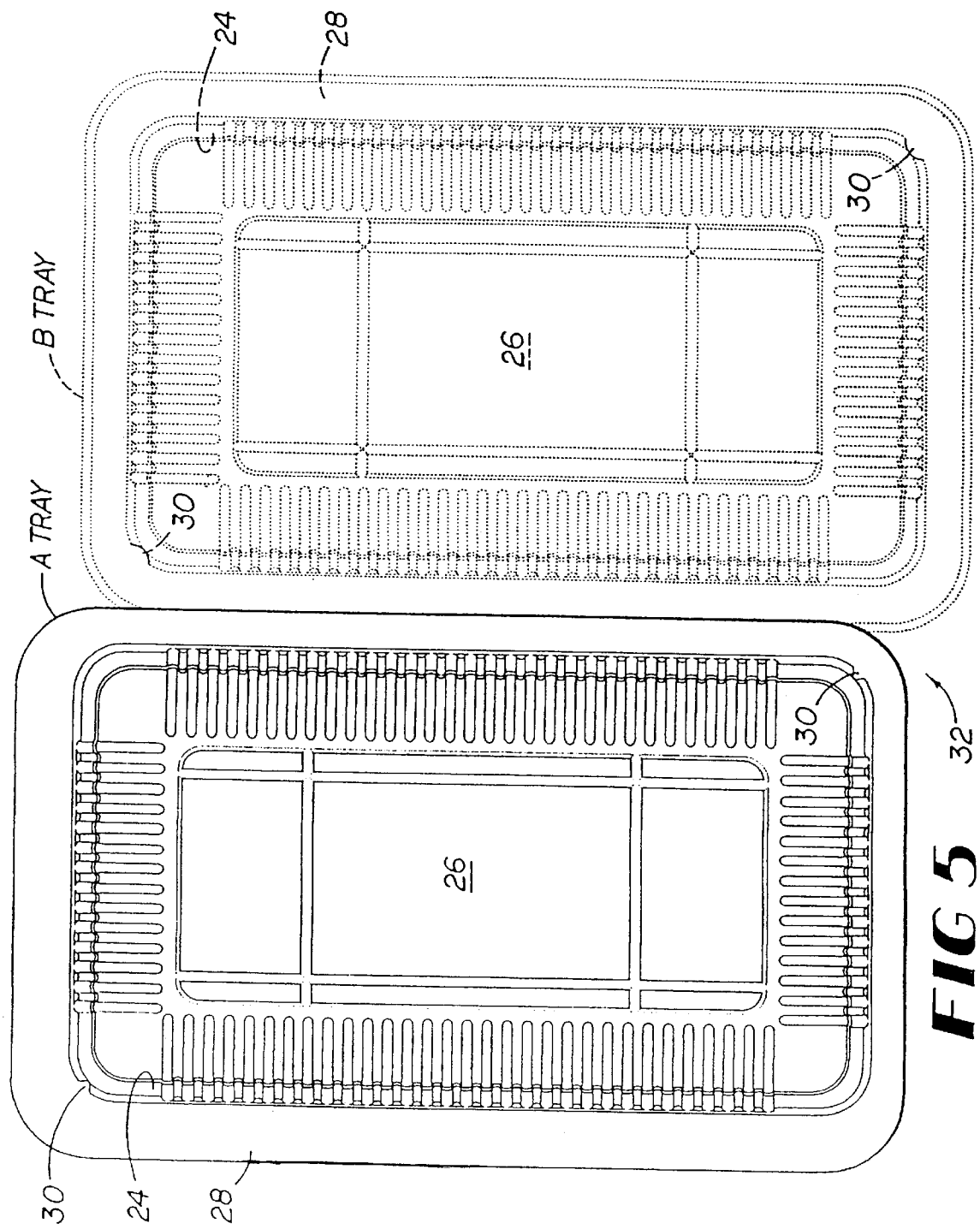
FIG. 5. is a schematic top plan view of a tray according to a fourth embodiment of the present invention.

FIG. 5 shows a two version embodiment of trays 12 according to the present invention in which the location of structures 30 is the same between versions, but the shape of structures 30 varies. Thus, wedge shaped structures 30 on tray 12 version A in FIG. 5 provide a resting point for arc shaped structures 30 on version B trays 12, and vice versa, in order to maintain desired separation between trays 12 and to reduce locking potential. Again, any number of structures 30 may be used.

Figure 6:
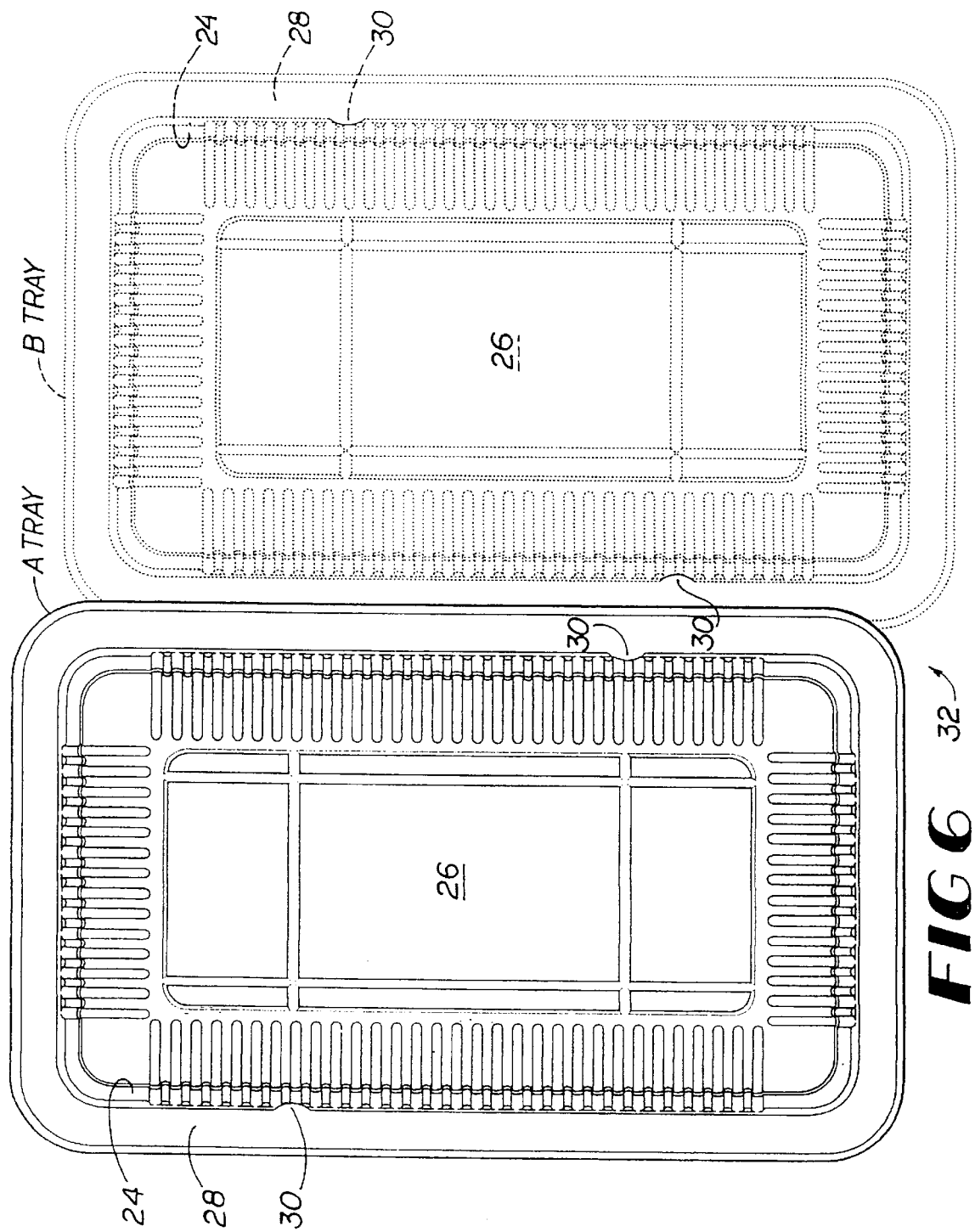
FIG. 6 is a schematic top plan view of a tray according to a fifth embodiment of the present invention.

FIG. 6 shows a two version embodiment of tray 12 according to the present invention in which separation structures 30 are placed on side walls 24 of tray 12. Here, as one particular embodiment, the structures 30 are the same shape on successive versions, but placed in different locations.

Figure 7:
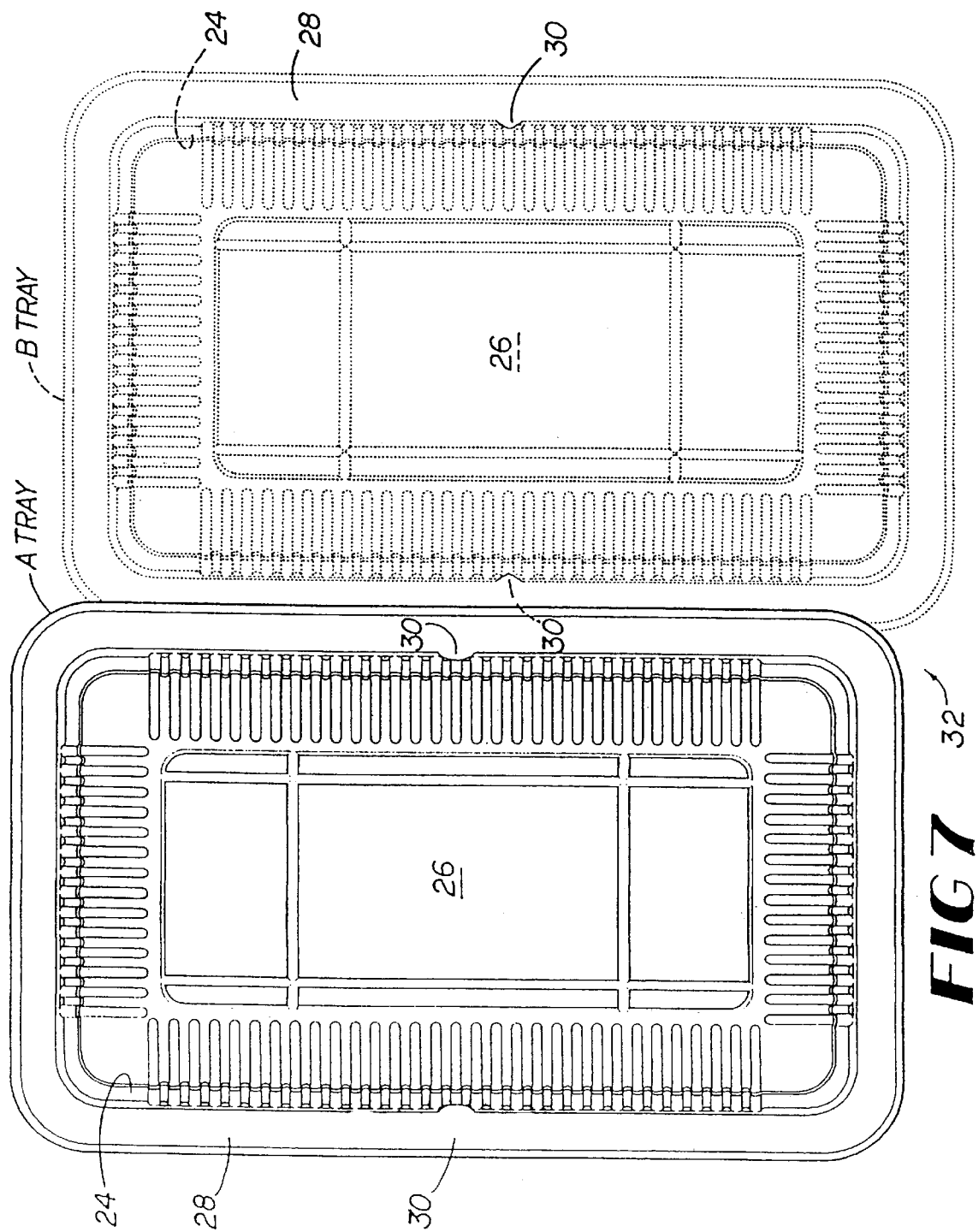
FIG. 7 is a schematic top plan view of a tray according to a sixth embodiment of the present invention.

FIG. 7 shows a two version embodiment of tray 12 according to the present invention in which the separation structures 30 are located on side walls 24 and feature the same location from one version to the next but different shapes.

Figure 8:
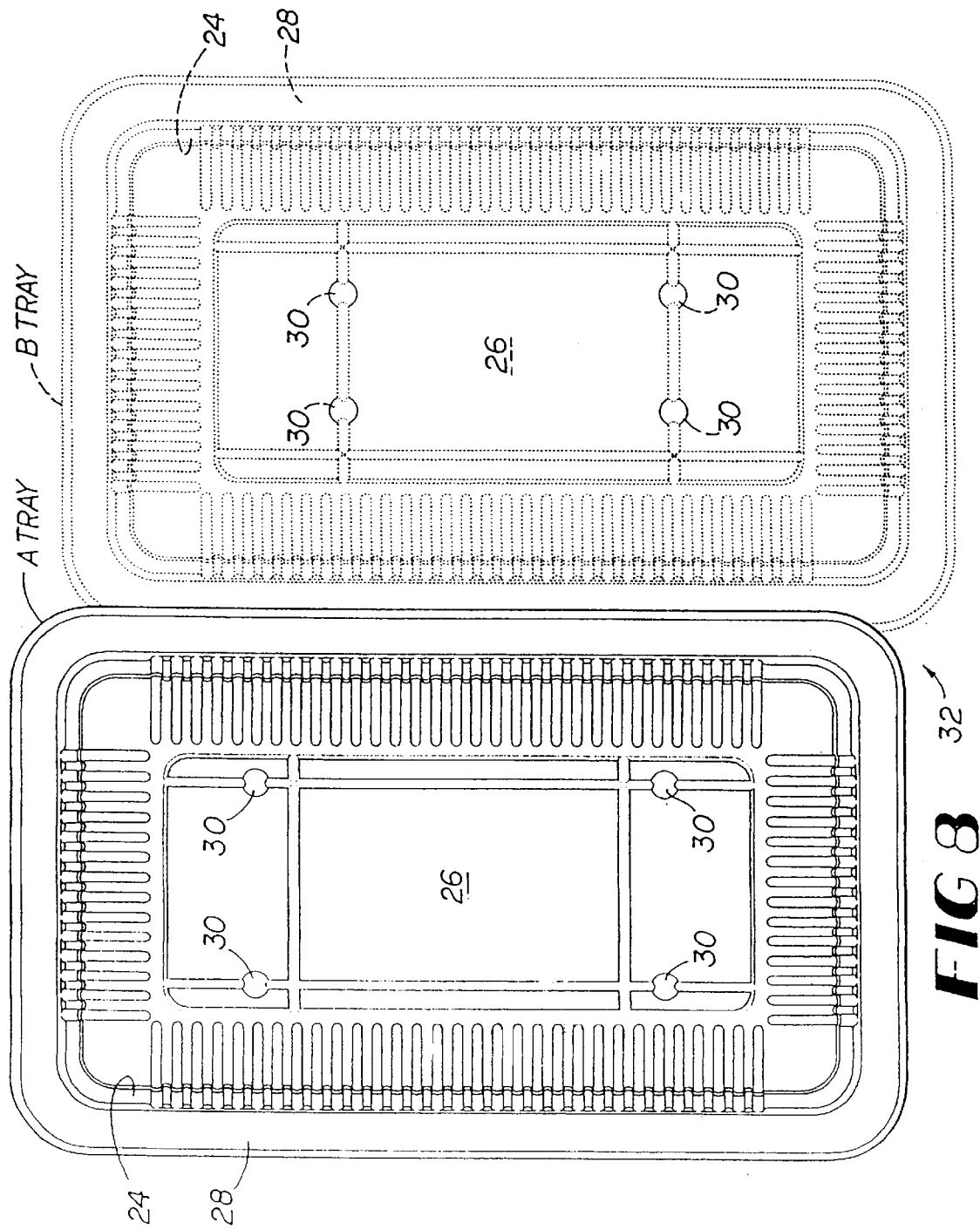
FIG. 8 is a schematic top plan view of a tray according to a seventh embodiment of the present invention.

FIG. 8 shows another embodiment of the two version tray 12 according to the present invention in which separation structures 30 are located on bottom 26 of tray 12 and have the same shape but different locations between versions. Again, these structures, as in all cases where position is the same from one version to the next, may have similar, identical, or different shapes from one version to the next.

Figure 9:
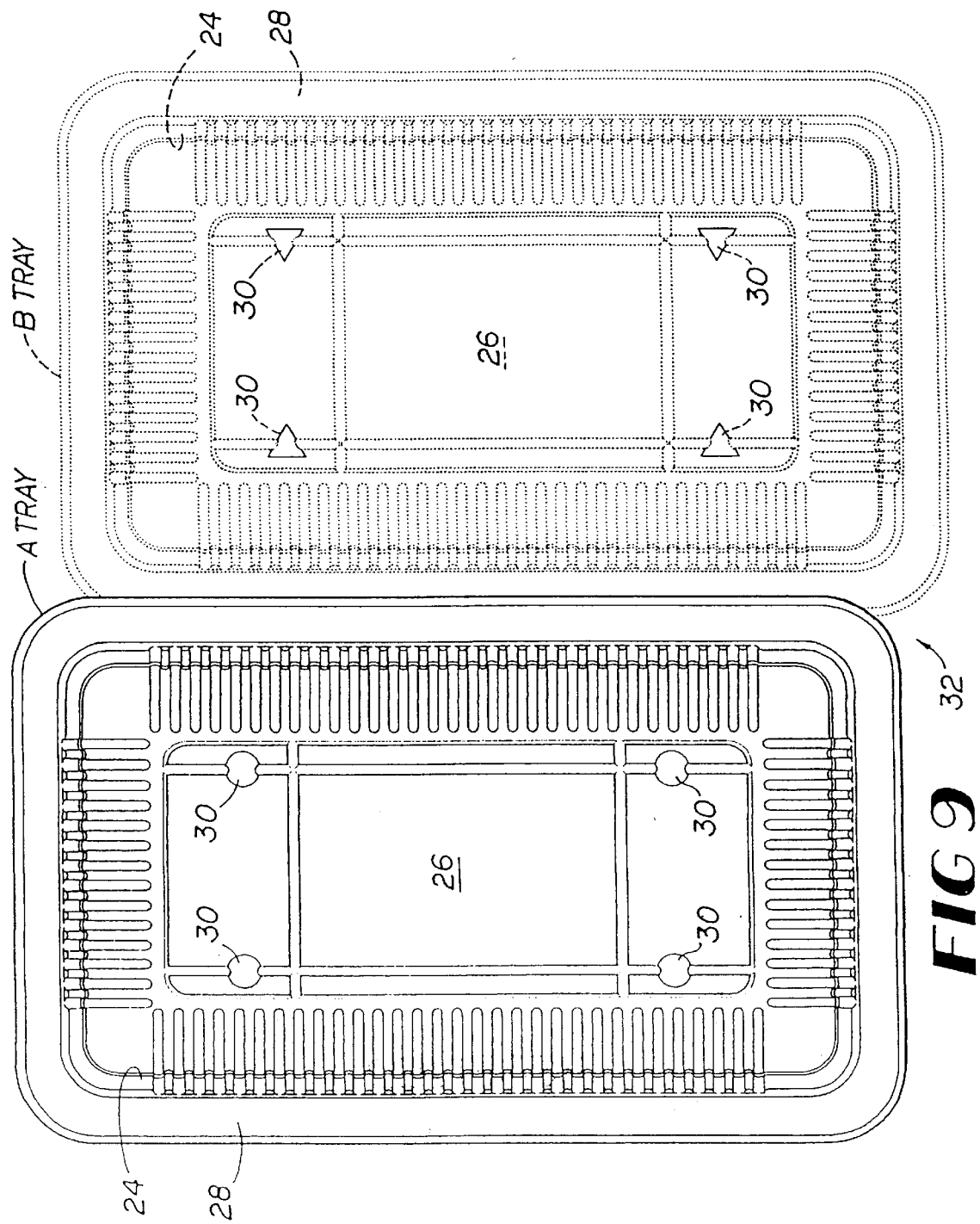
FIG. 9 is a schematic top plan view of a tray according to a eighth embodiment of the present invention.

FIG. 9 is a two version embodiment of tray 12 according to the present invention in which separation structures are located on the bottom 26 and feature the same location from one version to the next but different shape.

Figure 10:
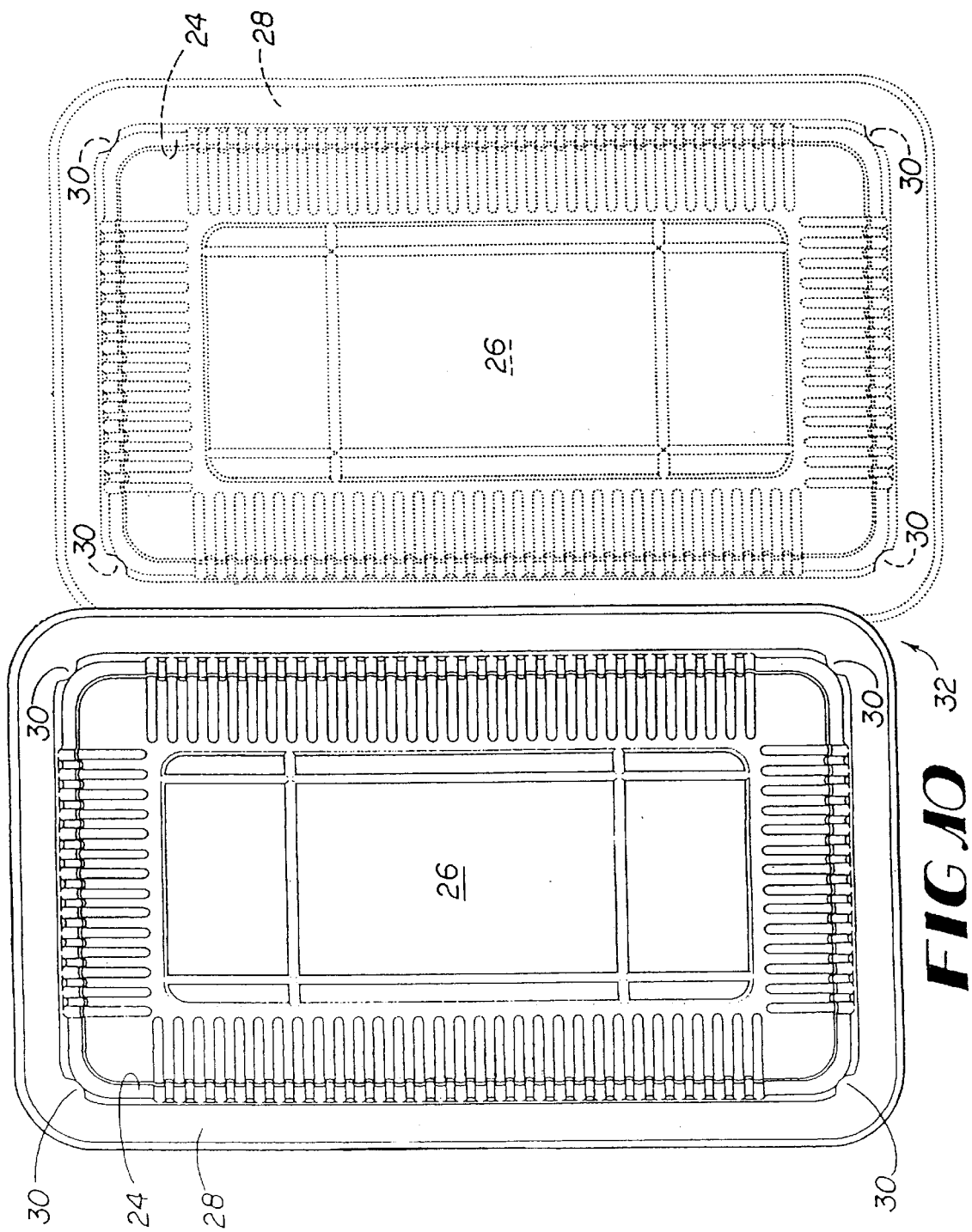
FIG. 10 is a schematic top plan view of a tray according to a ninth embodiment of the present invention.

FIGS. 10–12 show one version trays 12 according to the present invention in which separation structures 30 are solid or otherwise three dimensionally structured, filled, or partially filled with material to separate trays 12 in accordance with the present invention. FIG. 10 shows an embodiment in which three dimensional separation structures 30 are located in the vicinity of corners 34 while FIG. 11 shows such structures on side walls 24. FIG. 12 shows separation structures 30 on bottom 12. Such one version separation structures 30 may be located anywhere and in any number and configuration on tray 12 in order to achieve desired separation.

Separation structures 30 may manifest themselves in any number of positions or shapes or schemas to function in a way that causes physical separation of trays 12 for purposes of performing in a feeder in a product packaging line as discussed above. As isolated examples of additional structure not illustrated in the figures, separation structures 30 could be found not only on side walls 24, bottom 26, or corners 34 of trays 12, but also on flanges 28 or anywhere else desired. They may take the form of ribs or any other shape as desired to carry out the necessary separation result. Preferably, separation structures 30 have requisite strength to withstand compression forces as the trays 12 are stacked for shipping and deployment onto a production line, which compressive forces may otherwise reduce or eliminate separation between trays.

Figure 13:
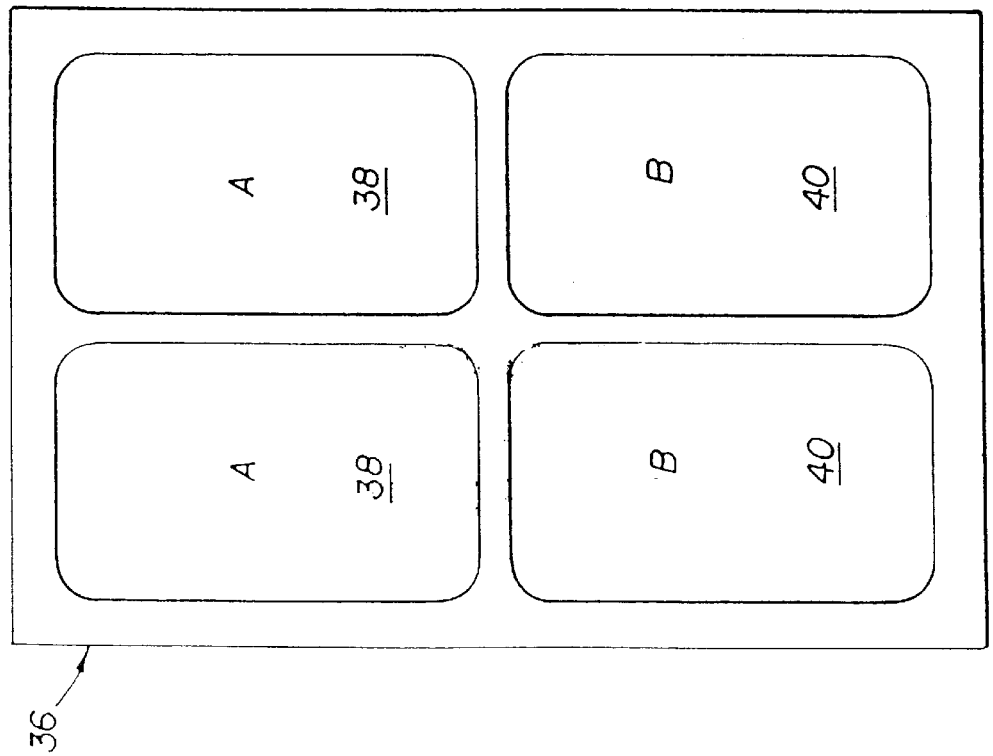
FIG. 13 is a schematic diagram of one form of mold insert according to the present invention for manufacturing different versions of trays according to one embodiment of the present invention.

FIG. 13 shows, schematically, one form of mold or mold insert 36 which may be used to thermoform two version trays 12 according to the present invention as shown, for instance, in FIGS. 3–9. Obviously multiple version trays such as three version or four version or more would follow a similar theme. A single version tray mold works conventionally. In the embodiment of molds 36 shown in FIG. 13, two cavities 38 labeled "A" are used to mold version A trays 12 and two cavities 40 labeled "B" are used to mold version B trays 12. The trays 12 extracted from this mold may be stacked according to conventional molding techniques, but in a manner that achieves the desired separation. They need not, for instance, be rotated after extraction in order to achieve the desired separation. According to this process, male and female mold components are positioned relative to each other and a suitable quantity of plastic material thermoformed to form a non-foam tray. The tray is then extracted and stacked in conventional fashion, but with suitable separation. Mold 36 may be formed with suitable structure to impart or form separation structures 30 as well as the rest of tray 12.

Figure 14:
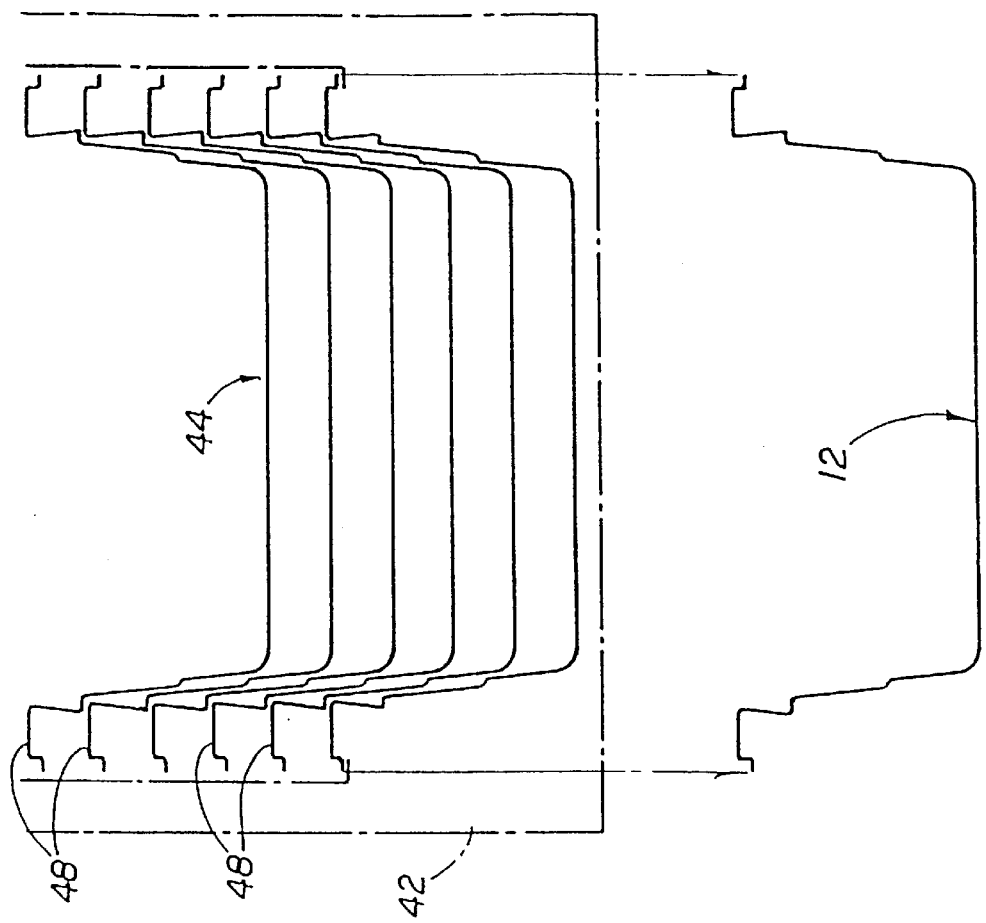
FIG. 14 is a schematic side elevational view of a stack of trays according to one embodiment of the present invention in a feeder for deployment onto a perishable product packaging process or line.

FIG. 14 schematically shows an automatic conventional dispenser, denester, stacker or feeder 42 with a stack 44 of trays 12 which may form part of a product packaging line 46 in accordance with the present invention. (Even though feeder 42 is conventionally structured, it may have to operate faster in centralized packaging lines.) As shown schematically in FIG. 14, trays 12 are stacked in stack 44 with predetermined separation 48 to enable proper dispensing by mechanical elements of the feeder 42 as well as to impart the desired resistance to locking of trays 12. Separation 48 helps achieve this by allowing feeder 14 to sense and handle individual trays 12 with electromechanical or other feeder components in a reliable, efficient, and fast manner to facilitate deployment of trays 12 onto line 46.

Figure 15:
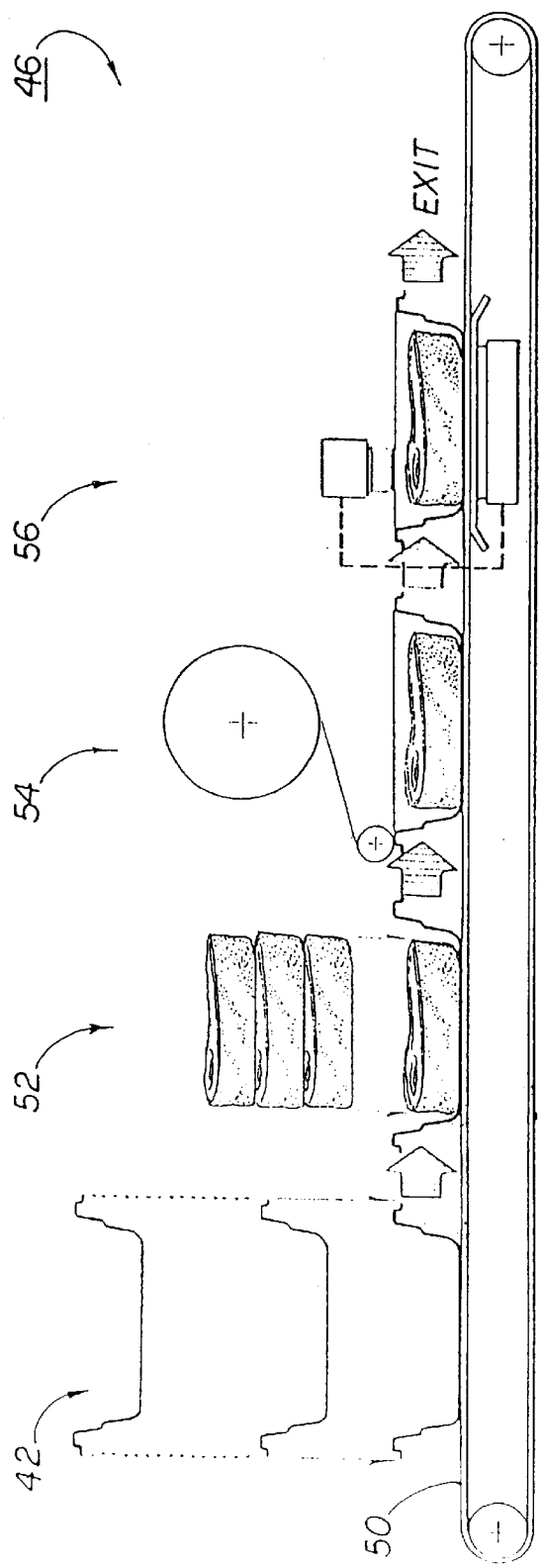
FIG. 15 is a schematic view of one line process for forming a product unit according to the present invention using one embodiment of trays according to the present invention.

As shown in FIG. 15, one form of packaging line 46 for use with packaging according to the present invention and which may occur, but need not, at a centralized facility, contains a lateral conveyor 50 which may be belt or structured in any desired way to move units from one position to the next in order for packaging to occur. Feeder 42 deploys trays 12 onto conveyor 50. They are indexed to a product feeder station 52 which may be implemented conventionally or otherwise, automatically, manually, or a combination of the two. The product-filled trays 12 are then indexed to a closure station 54 which may close product-filled tray with wrap or as otherwise desired to form a closure 16. Then, the closed tray 12 may proceed to other stations such as scales and labeling stations 56 which may be implemented conventionally, automatically, manually, or a combination of the two. Labels may contain bar codes or other optical indicia which allow automated tracking and handling of formed units 10 created on line 46. Units 10 prepared on the line 46 may then be stacked or otherwise deposited in appropriate shipping containers, deposited on transportation units such as trucks according to an automated process and then sent to point of sale for display and purchase.

Figure 16:
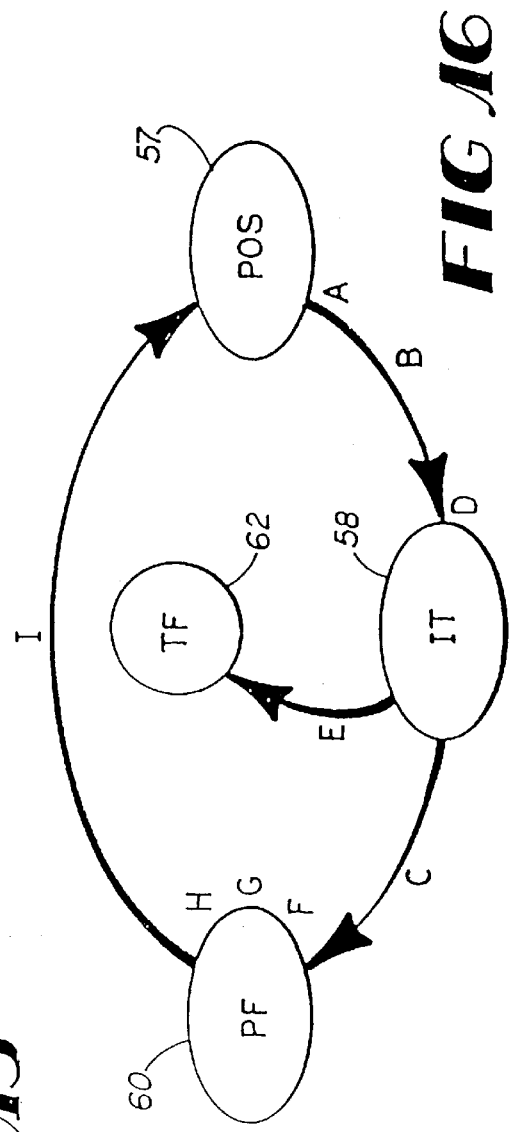
FIG. 16 is a process diagram for the present invention.

According to one process of the present invention, an integrated perishable product distribution system works as follows: At the point of sale, sale of a product unit such as a prepackaged T-bone steak is recorded. This may occur via bar code or other conventional SKU tracking techniques. After such capture of unit sale information, which is Step A shown in FIG. 16, unit sale information is reported to IT facility which may be any computer or data processing functionality located anywhere. Such IT facility has requisite processing, input/output, connectivity by data network or telecommunications network, and memory capacity to accommodate automated supply chain techniques. The reporting step is shown as B in FIG. 16. Unit sale information is processed by IT functionality 58 and, if desired, combined with other unit sale information and other information relating to the particular point of sale 57 and, if desired, other points of sale, and if desired other information about which inventory of product should be prepared and delivered to point of sale 57. This information is at least part of the basis for logistics information which IT functionality 58 sends to processing facility 60. IT functionality 58 may also track and manage information relating to transportation units. Such tracking is shown as Step D in FIG. 16. Transportation unit information can include information about location, manifest, and availability of trucks and other transportation units. IT functionality 58 can correlate transportation unit information with logistics information if desired and forward transportation required information to a transportation facility 62. Transportation facility 62 may be part of, co-located, separate from, distantly located, or otherwise positioned to manage units in a fleet for delivering inventory from one or more processing facilities 60 to one or more points of sale 57. Forwarding of transportation required information to transportation facility 62 is shown as Step E in FIG. 16. Based at least in part on logistics information delivered in Step C, processing facility, using a stack of trays 44 in accordance with the present invention on a processing line 46, or multiple processing lines 46, packages product 14 into units 10, stores units 10 if desired. This is shown as Step F in FIG. 16. Based in least in part on logistics information delivered in Step C, at the appropriate time processing facility 60 prepares a shipment of product for the particular point of sale 57. The shipment may contain multiple units of product such as T-bone steaks, ribs, ground beef, pork chops, salmon filets, and other products in various forms and sizes of packaging, at least some of which are manufactured in accordance with the present invention and labeled as desired. This is shown as Step G in FIG. 16. A transportation unit is deployed to processing facility 60 based at least on part of transportation unit information directly from IT facility 58, indirectly from processing facility 60 or otherwise. This is shown as Step H in FIG. 16. In Step I, transportation unit is loaded with shipment of units 10 which is then transported to point of sale 57, unloaded, displayed and sold. Sale information is captured as in Step A and the supply chain or logistics management process continues to manufacture, store, and ship process to multiple points of sale based at least in part on unit 10 sales at the various points of sale.

The structures and processes described above illustrate particular instantiations of the inventive concepts included in the present invention. Other structures and processes which achieve tray spacing and facilitate fast, efficient, reliable product packaging and, if desired, doing so in an environment that allows product to be packaged at a processing facility distant from points of sale and transported to points of sale based on an automated inventory tracking and management system, and various steps in carrying out these processes may be modified, without departing from the scope or spirit of the invention.

What is claimed is:

1. A process for preparing case ready meat products for shipping and sale, the meat products thereby adapted to be displayed for sale in a display case at a retail point of sale, comprising:

A. providing a plurality of a first nonfoam trays having a bottom and walls;
   the first trays having a plurality of separation structures;
   the separation structures adapted to cause the trays to denest automatically from other trays;

B. providing a plurality of second nonfoam trays having a bottom and walls;
   the second trays having a plurality of separation structures;
   whereby at least some of the separation structures on the second trays are positioned at locations on the second trays different from the locations at which corresponding separation structures on the first trays are located;
   the separation structures adapted to cause the trays to denest automatically from other trays;

C. whereby the first and second trays are provided in a stack in which at least some of the first trays are interleaved with at least some of the second trays in order to promote denesting of the trays in a dispensing station;

D. dispensing the trays from the stack in a dispensing machine;

E. placing case ready meat product into at least some of the trays, the meat product ready to be displayed for sale in a display case at a retail point of sale; and F. sealing at least some of the trays and meat products with a closure.

2. A process according to claim 1 wherein the separation structures comprise lugs located on said walls of said trays.

3. A process according to claim 2 wherein each tray contains at least 4 lugs.

4. A process according to claim 1 wherein at least some of the separation structures on the first tray are different in shape from at least some of the separation structures on the second tray.

5. A process according to claim 1 wherein the closures comprise film.

6. A process according to claim 1 wherein the trays are formed of material adapted to withstand automatic dishwasher cleaning and cooking of the meat product in the trays in an oven without substantial deformation of the trays.

7. A plurality of combinations according to claim 6, wherein the oven is a microwave oven.

8. A plurality of combinations according to claim 6, wherein the oven is a conventional oven.

9. A plurality of combinations according to claim 1, wherein the trays comprise a gas barrier.

10. A process for preparing case ready meat products for shipping and sale, the meat products thereby adapted to be displayed for sale in a display case at a retail point of sale, comprising:

A. providing a plurality of a first nonfoam trays having a bottom and walls;
   the first trays having a plurality of separation structures;
   the separation structures adapted to cause the trays to denest automatically from other trays;

B. providing a plurality of second nonfoam trays having a bottom and walls;
   the second trays having a plurality of separation structures;
   whereby at least some of the separation structures on the second trays are shaped differently than corresponding separation structures on the first trays;
   the separation structures adapted to cause the trays to denest automatically from other trays;

C. whereby the first and second trays are provided in a stack in which at least some of the first trays are interleaved with at least some of the second trays in order to promote denesting of the trays in a dispensing station;

D. dispensing the trays from the stack in a dispensing machine;

E. placing case ready meat product into at least some of the trays, the meat product ready to be displayed for sale in a display case at a retail point of sale; and F. sealing at least some of the trays and meat products with a closure.

11. A process according to claim 10 wherein the separation structures comprise lugs located on said walls of said trays.

12. A plurality of combinations according to claim 11 wherein each at least 4 lugs.

13. A process according to claim 10 wherein at least some of the separation structures on the first tray are located at the same locations on the first tray as at least some of the separation structures are located on the second tray.

14. A plurality of combinations according to claim 10 wherein at least some of the separation structures on the first tray are not located at the same locations on the first tray as at least some of the separation structures are located on the second tray.

15. A process according to claim 10 which the closures comprise film.

16. A process according to claim 10 wherein the trays are formed of material adapted to withstand automatic dishwasher cleaning and cooking of the meat product in the trays in an oven without substantial deformation of the trays.

17. A process according to claim 16, wherein the oven is a microwave oven.

18. A plurality of combinations according to claim 16, wherein the oven is a conventional oven.

19. A process according to claim 10, wherein the trays comprise a gas barrier.

20. A process for preparing case ready meat products for shipping and sale, the meat products thereby adapted to be displayed for sale in a display case at a retail point of sale, comprising:

A. providing a plurality of a first nonfoam trays having a bottom and walls;
the first trays having a plurality of separation structures;
the separation structures adapted to cause the trays to denest automatically from other trays;

B. providing a plurality of second nonfoam trays having a bottom and walls;
the second trays having a plurality of separation structures;
whereby the separation structures on the second trays are adapted not to nest with separation structures on the first trays;
the separation structures adapted to cause the trays to denest automatically from other trays;

C. whereby the first and second trays are provided in a stack in a manner so as to automatically denest in a dispensing station;

D. dispensing the trays from the stack in a dispensing station;

E. placing case ready meat product into at least some of the trays, the meat product ready to be displayed for sale in a display case at a retail point of sale; and F. sealing at least some of the trays and meat products with a closure.

21. A process according to claim 20 wherein at least some of the separation structures on the first trays are positioned on the first trays at locations different than the positions on the second trays at which at least some of the separation structures on the second trays are located, in order to cause separation structures on the first trays not to nest with separation structures on the second trays.

22. A process according to claim 20 wherein at least some of the separation structures on the first trays are shaped differently from at least some of the separation structures on the second trays, in order to cause separation structures on the first trays not to nest with separation structures on the second trays.

23. A process according to claim 20 wherein the separation structures have the same shape on all trays and are located in the same position on all trays.

24. A process according to claim 20 wherein the separation structures comprise lugs located on said walls of said trays.

25. A process according to claim 21 wherein each tray contains at least 4 lugs.

26. A process according to claim 20 wherein the trays are formed of material adapted to withstand automatic dishwasher cleaning and cooking of the meat product in the trays in an oven without substantial deformation of the trays.

27. A process according to claim 26, wherein the oven is a microwave oven.

28. A process according to claim 26, wherein the oven is a conventional oven.

29. A process according to claim 20, wherein the trays comprise a gas barrier.

* * * * *